United States Patent
Soria et al.

(10) Patent No.: US 9,476,359 B2
(45) Date of Patent: Oct. 25, 2016

(54) ACOUSTIC LINER

(71) Applicant: Rohr, Inc., Chula Vista, CA (US)

(72) Inventors: Christian Soria, La Mesa, CA (US); Jose S. Alonso-Miralles, Chula Vista, CA (US); Hwa-Wan Kwan, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 14/251,226

(22) Filed: Apr. 11, 2014

(65) Prior Publication Data

US 2015/0292413 A1   Oct. 15, 2015

(51) Int. Cl.
| | |
|---|---|
| *F02C 7/045* | (2006.01) |
| *F02C 7/24* | (2006.01) |
| *B64C 1/40* | (2006.01) |
| *E04B 1/82* | (2006.01) |
| *F02K 1/82* | (2006.01) |
| *G10K 11/172* | (2006.01) |
| *F02C 7/00* | (2006.01) |
| *B64C 1/00* | (2006.01) |

(52) U.S. Cl.
CPC . *F02C 7/24* (2013.01); *E04B 1/82* (2013.01); *F02K 1/827* (2013.01); *G10K 11/172* (2013.01); *F05D 2250/185* (2013.01); *F05D 2260/963* (2013.01); *Y02T 50/672* (2013.01)

(58) Field of Classification Search
CPC ............ F02C 7/24; F02C 7/045; E04B 1/82; B64C 1/40
USPC ............... 181/290, 288, 292, 214; 244/53 B, 244/123.13, 123.6
See application file for complete search history.

(56) References Cited

U.S. PATENT DOCUMENTS

| | | | |
|---|---|---|---|
| 3,542,152 A | 11/1970 | Adamson et al. | |
| 3,821,999 A * | 7/1974 | Guess et al. | 181/296 |
| 3,831,710 A * | 8/1974 | Wirt | 181/286 |
| 3,948,346 A | 4/1976 | Schindler | |
| 4,141,433 A * | 2/1979 | Warnaka | 181/286 |
| 4,158,401 A * | 6/1979 | Matsumoto et al. | 181/210 |
| 4,163,479 A * | 8/1979 | Bschorr | 181/286 |
| 6,182,787 B1 * | 2/2001 | Kraft et al. | 181/292 |
| 7,124,856 B2 | 10/2006 | Kempton et al. | |
| 7,712,576 B2 * | 5/2010 | Goto et al. | 181/225 |
| 7,959,109 B2 | 6/2011 | Dasilva et al. | |
| 7,963,362 B2 | 6/2011 | Lidoine | |
| 7,971,684 B2 | 7/2011 | Gantie et al. | |
| 8,245,815 B2 | 8/2012 | Valleroy et al. | |
| 8,544,598 B2 | 10/2013 | Gaudry et al. | |
| 8,646,574 B2 | 2/2014 | Drevon et al. | |
| 8,684,301 B2 | 4/2014 | Porte et al. | |
| 8,833,515 B2 * | 9/2014 | Todorovic | 181/292 |
| 8,931,588 B2 * | 1/2015 | Murray | 181/214 |
| 2004/0069564 A1 * | 4/2004 | Wang et al. | 181/293 |
| 2010/0206664 A1 * | 8/2010 | Bagnall | 181/214 |
| 2010/0284789 A1 * | 11/2010 | Brooks et al. | 415/119 |

* cited by examiner

Primary Examiner — Edgardo San Martin
(74) Attorney, Agent, or Firm — O'Shea Getz P.C.

(57) ABSTRACT

An acoustic liner has a honeycomb layer disposed between a first panel and a permeable panel and includes a plurality of serpentine walls spaced apart from one-another. Adjacent serpentine walls outline in-part a first region carried by the first panel and an opposing second region carried by the permeable panel. The first and second regions are offset such that a centerline distance extending between the regions and centered between adjacent walls is greater than a distance measured directly between the panels, enabling the design of thinner acoustic liners. The regions and adjacent walls further define a cell having a constricted portion communicating between an end portion and an entry portion such that the constricted portion creates a frequency shift.

5 Claims, 3 Drawing Sheets

ACOUSTIC LINER

BACKGROUND

The present disclosure relates to an acoustic liner and more particularly to a passive, honeycomb, acoustic liner for attenuating noise in, for example, a gas turbine engine.

A gas turbine engine may include an acoustic liner for attenuating noise generated during engine operation. A typical acoustic liner includes a honeycomb core connected between a solid face sheet and a perforated face sheet. This honeycomb core includes a plurality of resonating cavities. The honeycomb core may have a height that tunes the resonating cavities to a specific target frequency of the noise to be attenuated.

New aircraft engine designs are facing increasing noise restrictions within the boundaries of airports by many government regulatory agencies. Accordingly, recent trends in aircraft engine design have highlighted the need for acoustic liners that provide sound suppression, such as tonal and broadband sound absorption at relatively low frequencies while utilizing substantially the same or less space than previous liners. Therefore, there is a need in the art for an improved noise attenuating acoustic panel with reduced acoustic liner thickness.

SUMMARY

An acoustic liner according to one, non-limiting, embodiment of the present disclosure includes a panel; a permeable panel spaced from the first panel; a plurality of serpentine walls spaced from one-another; and wherein each respective one of the plurality of serpentine walls extend between the panel and the permeable panel.

Additionally to the foregoing embodiment, the panel is non-permeable.

In the alternative or additionally thereto, in the foregoing embodiment, the liner includes a plurality of walls spaced from one another; and wherein each respective one of the plurality of walls span through the plurality of serpentine walls and extend between the panel and the permeable panel.

In the alternative or additionally thereto, in the foregoing embodiment, a cell is defined between first and second adjacent walls of the plurality of walls, between adjacent first and second serpentine walls of the plurality of serpentine walls, and between a first region of the panel and a second region of the permeable panel.

In the alternative or additionally thereto, in the foregoing embodiment, the first and second regions are offset along the respective panels.

In the alternative or additionally thereto, in the foregoing embodiment, the first and second regions are spaced from one-another along the respective panels.

In the alternative or additionally thereto, in the foregoing embodiment, the second region includes a perforation.

In the alternative or additionally thereto, in the foregoing embodiment, the cell has a first portion defined in-part by the first region, a second portion defined in-part by the second region, and a constricted portion in fluid communication between the first and second portions and defined in-part between the first and second serpentine walls.

In the alternative or additionally thereto, in the foregoing embodiment, each one of the plurality of serpentine walls extend laterally from the panel to the permeable panel and includes a lateral cross sectional profile that is serpentine in shape.

A liner for a turbofan engine according to another, non-limiting, embodiment includes a honeycomb layer having a plurality walls spaced from one-another, each wall having a first bend portion and an opposite second bend portion; a first panel substantially disposed concentrically to an engine axis and carrying a first region defined between adjacent walls of the plurality of walls; a perforated panel spaced radially inward of the first panel, and carrying a second region defined between the adjacent walls of the plurality of walls; and wherein the first region is opposed to, and offset from, the second region.

Additionally to the foregoing embodiment, the liner includes a cell having an end portion, a constricted portion, and an entry portion with the constricted portion being in fluid communication between the end portion and the entry portion; and wherein the end portion is defined in part by the first region and the adjacent walls, the constricted portion is defined between the adjacent walls, and the entry portion is defined between the adjacent walls and the second region.

In the alternative or additionally thereto, in the foregoing embodiment, the adjacent walls overlap generally at the constricted portion when viewing in a direction substantially normal to the perforated panel.

In the alternative or additionally thereto, in the foregoing embodiment, a centerline distance extending through the cell and from the first panel to the perforated panel is greater than a distance measured directly between the first panel and the perforated panel.

In the alternative or additionally thereto, in the foregoing embodiment, the first panel is solid, and a hole in the perforated panel is in fluid communication with the entry portion.

In the alternative or additionally thereto, in the foregoing embodiment, the plurality of walls are substantially identical to one-another.

The foregoing features and elements may be combined in various combinations without exclusivity, unless expressly indicated otherwise. These features and elements as well as the operation thereof will become more apparent in-light of the following description and the accompanying drawings. It should be understood, however, the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
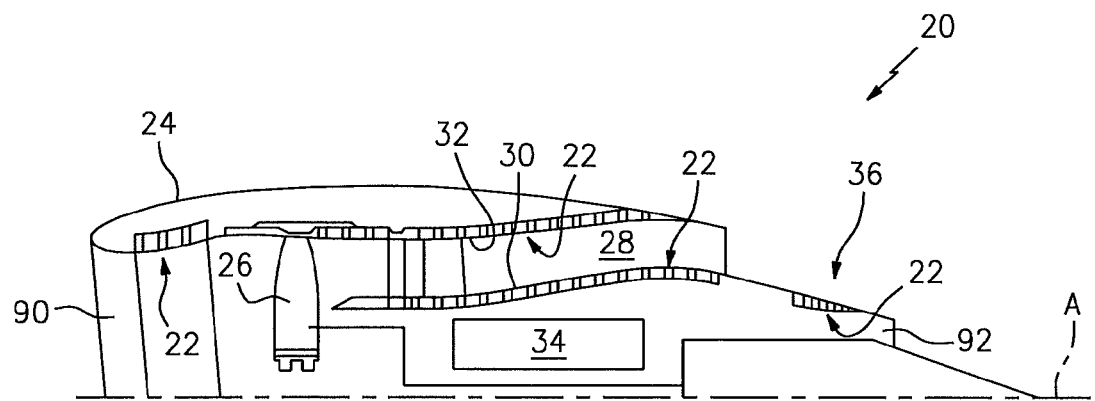
FIG. 1 is a partial cross section of a turbofan engine including an acoustic liner of the present disclosure.

Referring to FIG. 1, a turbofan engine 20 is illustrated as one example of an application using an acoustic liner 22 of the present disclosure. The engine 20 is centered about an axis A, and includes a nacelle intake cowling 24, a fan section 26 downstream of the intake cowling 24, an annular air bypass flowpath 28 downstream of the fan section 26 and defined between radial inner and outer walls 30, 32, an engine core 34 located radially inward of the inner wall 30, and an exhaust nozzle 36 located downstream of the engine core 34. The acoustic liner 22 may be carried by radially inward facing wall of the intake cowling 24, the inner and/or outer walls 30, 32, and/or the exhaust nozzle 36 to suppress noise in the respective vicinities. It is further contemplated and understood that the acoustic liner 22 may be applied to any other application where noise suppression is desirable.

Figure 2:
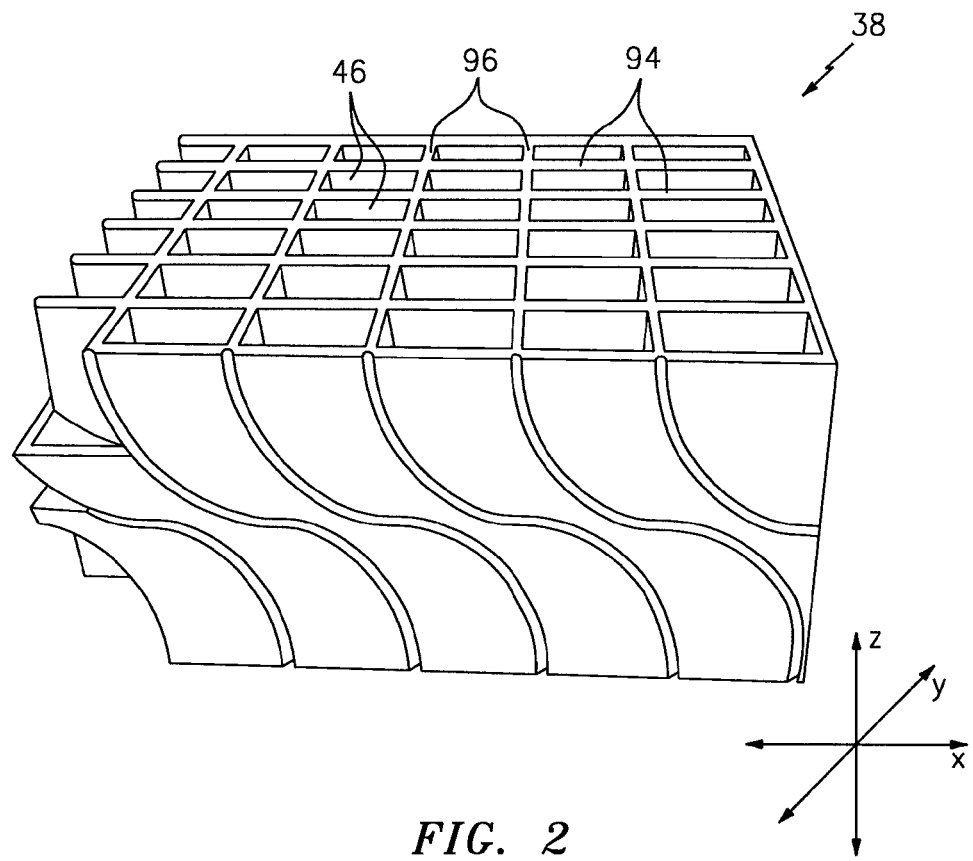
FIG. 2 is a partial perspective view of the acoustic liner with portions removed to show detail.
Figure 3:
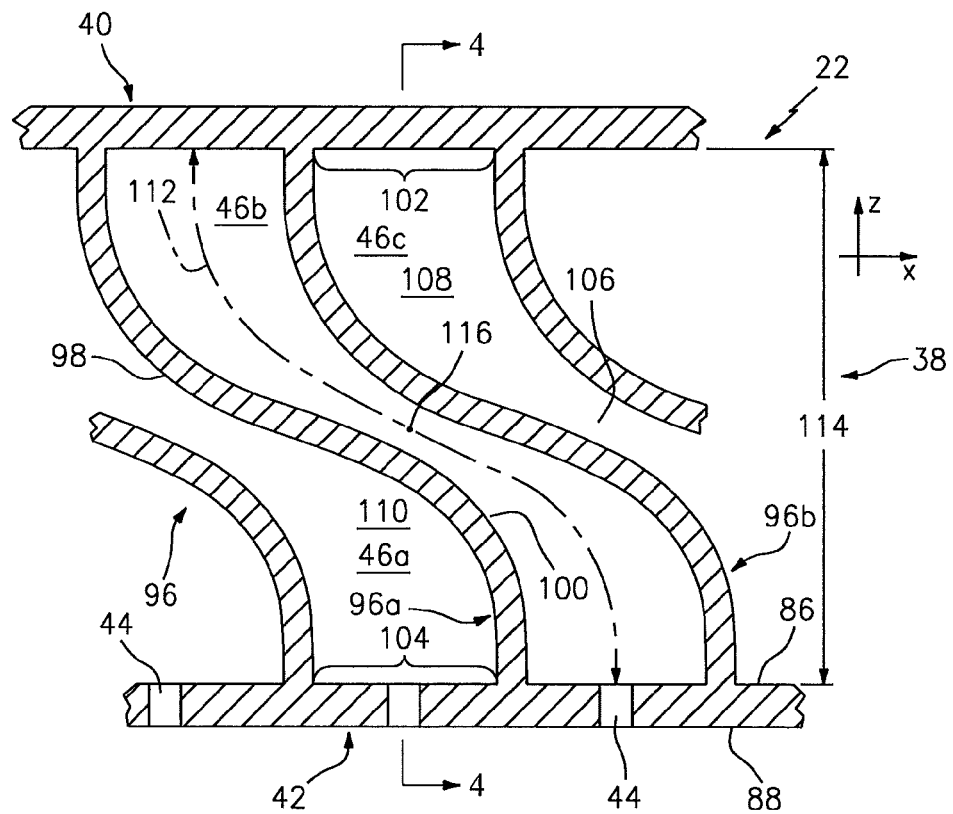
FIG. 3 is a cross section of the acoustic liner.
Figure 4:
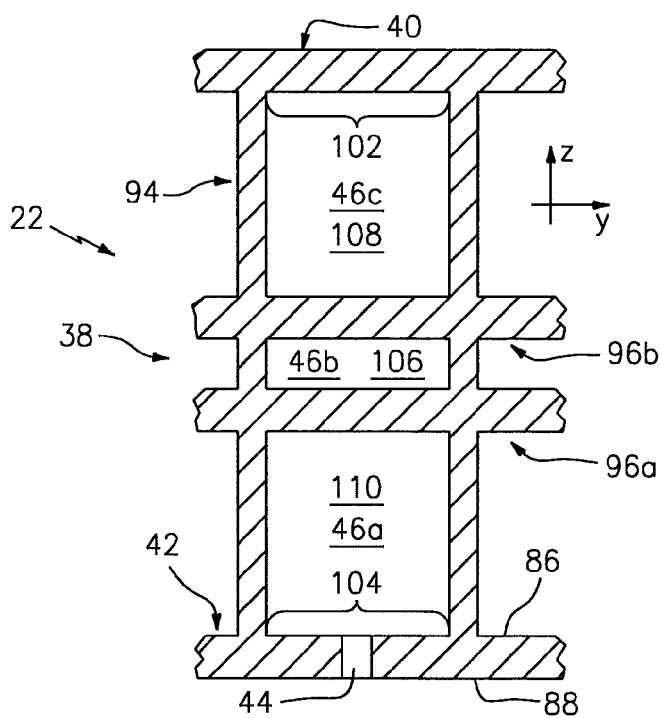
FIG. 4 is a cross section of the acoustic liner taken along line 4-4 of FIG. 3.

Referring to FIGS. 2 through 4, the acoustic liner 22 may have a honeycomb layer 38 engaged between two panels 40, 42. Panel 40 may be a base or backing panel that may be generally solid and impermeable. Panel 42 may be a face skin that is permeable and may be perforated having a plurality of holes or perforations 44, with at least one hole or perforation communicating with a respective one of a plurality of cells 46 in the honeycomb layer 38. Alternatively, panel 42 may be configured as a mesh layer, a combination of a perforated layer and a mesh layer, a screen or other type of skin that permits the passage of air. Panel 40, 42 may be evenly spaced from one-another and substantially planar; or, and depending upon the application, the panels 40, 42 may be cylindrical and spaced radially apart from one another about, for example, the engine axis A. Although presently illustrated as a single degree of freedom (one resonance) acoustic liner, it is further contemplated and understood that panel 40 may also be permeable and backed with another acoustic layer or honeycomb to produce a multi-layered acoustic liner.

With further regard to the turbofan engine 20 application (see FIG. 1), the permeable panel 42 of the acoustic liner 22 is a perforated panel having a first face 86 that defines in-part the cell 46 and an opposite face 88 that may define an air passage in, or about, the engine. For example, face 88 may be generally cylindrical and may define, at least in-part, an intake passage 90 of the intake cowling 24. Alternatively, the face 88 may define, at least in-part, the bypass flowpath 28 and/or an exhaust channel 92 of the exhaust nozzle 36. It should be appreciated to those skilled in the art that the physical dimensions of the acoustic liner 22 may be altered or tuned to suppress targeted resonating frequency bandwidths without departing from the novelties of the present disclosure. For instance, the liner 22 may be tuned to suppress the relatively high frequency bandwidths emitted from a turbine section of the engine core 34, or may be tuned to suppress the lower frequency bandwidths emitted from a combustor section of the engine core 34.

The honeycomb layer 38 may have a plurality of first walls 94 that are spaced from one-another, and a plurality of second walls 96 also spaced from one-another and crossing through the plurality of first walls 94 thereby defining an array or matrix of cells 46. Referring to FIG. 2, the first walls 94 may extend longitudinally (at least in-part, or substantially), along a y-coordinate, and the second walls 96 may extend longitudinally (at least in-part, or substantially), along an x-coordinate. The panels 40, 42 may each substantially span in respective x-y coordinate planes, and the walls 94, 96 may span laterally and at least in-part between the panels 40, 42 in a z-coordinate direction.

The first walls 94 may be substantially planar, parallel to one-another and disposed substantially normal to the panels 40, 42. The second walls 96 span laterally to engage the panels 40, 42 and may be generally identical and redirected, or serpentine, in the lateral direction. That is, a cross sectional profile of the wall 96 taken in the x-z coordinate plane resembles a serpentine profile having opposite bend portions 98, 100 (i.e. cupped in substantially opposite directions). The cells 46 may thus be serpentine in shape with each cell defined by adjacent serpentine walls 96, adjacent walls 94 that intersect walls 96, and opposing regions 102, 104 of the respective panels 40, 42. Each region 102, 104 may be orthogonal in shape and/or substantially square with an outer perimeter generally defined by the connecting walls 94, 96. Due to the opposite bend portions 98, 100, the opposing regions 102, 104 are offset from one-another generally in the x-coordinate direction. The bend portions 98, 100 may be sharp or gradual curves, or any means of re-direction that may be less than ninety degrees. That is, as the serpentine wall 96 spans substantially in a positive z-coordinate direction, the wall is redirected (at least partially) in an x-coordinate direction at the second bend portion 100, and is then re-directed, once again, in the substantially positive z-coordinate direction at the first bend portion 98. Each bend portion 98, 100 may have an angular range (i.e. degree of re-direction) that falls between about forty-five degrees to ninety degrees.

Each cell 46 has a constricted portion 106 communicating between an end portion 108 and an entry portion 110 that communicates with the hole 44. The end portion 108 is defined in-part by region 102 of panel 40 and has a cross sectional flow area generally equal to, or slightly less than, the area of region 102. Similarly, the entry portion 110 is defined in-part by the region 104 of face 86 of panel 42 and has a flow area that is generally equal to, or slightly less than, the area of region 104. The constricted portion 106 has a flow area substantially smaller than the flow areas of the end and entry portions 108, 110. This constricted feature changes the cavity dynamics to yield a frequency shift in the resonances (and/or anti-resonances), that could be tailored for certain frequency targets depending on the magnitude of the constriction and its location along the cavity centerline.

A centerline of each cell 46 has a centerline distance or length (see arrow 112) that is greater than a z-coordinate distance (see arrow 114) between the two panels 40, 42. The greater the offset between regions 102, 104 the greater is the centerline distance 112. As illustrated in FIG. 3, this offset may be such that the regions 102, 104 are spaced from one another along the x-coordinate direction. When the regions 102, 104 are spaced apart, the adjacent serpentine walls 96 overlap one-another. That is, a cross sectional profile of the acoustic liner 22 taken along a y-z plane and through a centerpoint 116 of the constricted portion 106 will depict a first serpentine wall 96a beneath an adjacent second serpentine wall 96b (see FIG. 4). More specifically, when viewing in a radially directed line-of-sight, the adjacent serpentine walls 96 overlap one-another.

Because the adjacent serpentine walls 96a, 96b overlap, so do adjacent cells 46. More specifically and considering the plurality of cells 46 having adjacent cells 46a, 46b, 46c lined up along the x-coordinate direction, and when viewing the y-z plane cross sectional profile taken through centerpoint 116, the constricted portion 106 of cell 46b is located between the entry portion 110 of cell 46a and the end portion 108 of cell 46c. Yet further, serpentine wall 96a is located between and defines in-part the constricted portion 106 of cell 46b and the entry portion 110 of cell 46a, and the serpentine wall 96b is located between and defines in-part the constricted portion 106 of cell 46b and the end portion 108 of cell 46c.

Centerline distance 112 is the effective distance that dictates the frequency ranges that can be suppressed. Generally, by increasing distance 112, the acoustic liner 22 can suppress lower frequency ranges. The serpentine walls 96 thus perform two advantageous functions; first, the constricted portion 106 creates a frequency shift, and second, the increased centerline distance 112 enables suppression of lower frequency ranges that traditionally required much thicker acoustic liners.

The centerline 112 generally runs through the centerpoint 116 of the constricted portion 106. Each centerpoint 116 of each cell 46 may substantially lie within a common x-y plane. The centerpoint 116 may or may not be centered between the panels 40, 42. Generally, placement of this centerpoint 116 with respect to the panels 40, 42 is one of many means to tune the acoustic liner 22 for a specific application. Generally, when the centerpoint 116 is centered between the panels 40, 42 a cell anti-resonance is at or shifted to lower frequencies. If the centerpoint 116 is located closer to the panel 42 (or face skin), a first cell resonance is shifted to a lower frequency and the anti-resonance may not be impacted. If the centerpoint 116 is shifted toward the back panel 40, a second cell resonance may change, but the first cell resonance and the cell anti-resonance may stay about the same.

The acoustic liner 22 may be made of any variety of materials depending upon a particular application including metals, composites and ceramics. For instance, if the acoustic liner 22 is applied to the exhaust nozzle 36 of the turbofan engine 20, a liner made of ceramic may be desirable to withstand exposure to high temperatures. The liner may be manufactured using any variety and combinations of known manufacturing techniques; and, for more complex liner structures may be manufactured using, at least in-part, an additive manufacturing process.

Figure 5:
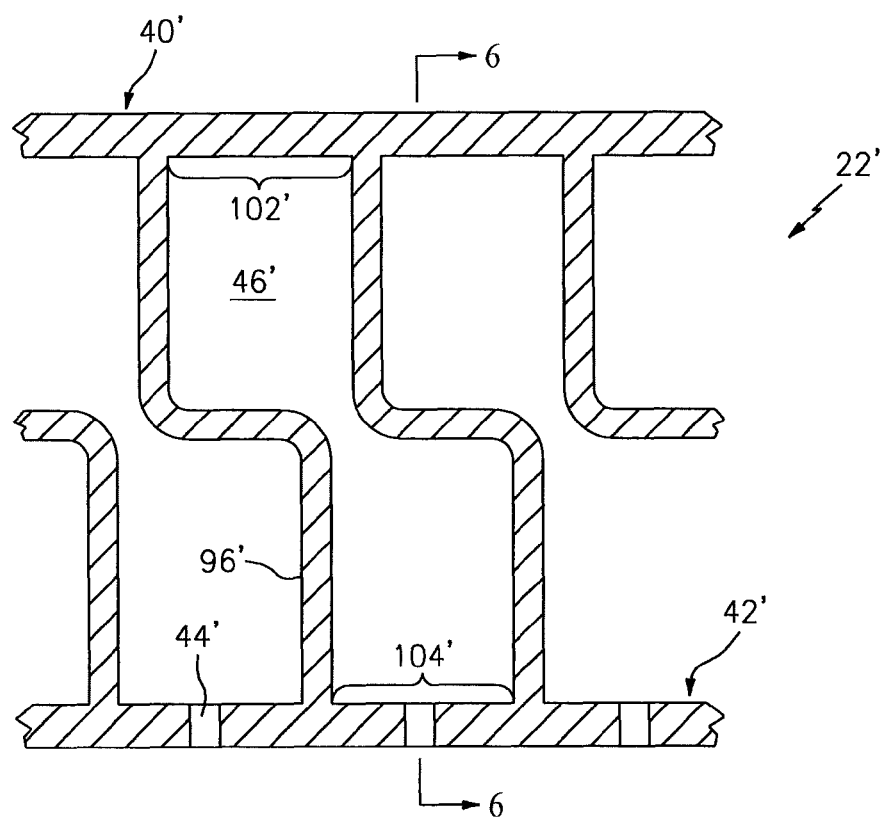
FIG. 5 is a cross section of a second embodiment of the acoustic liner.
Figure 6:
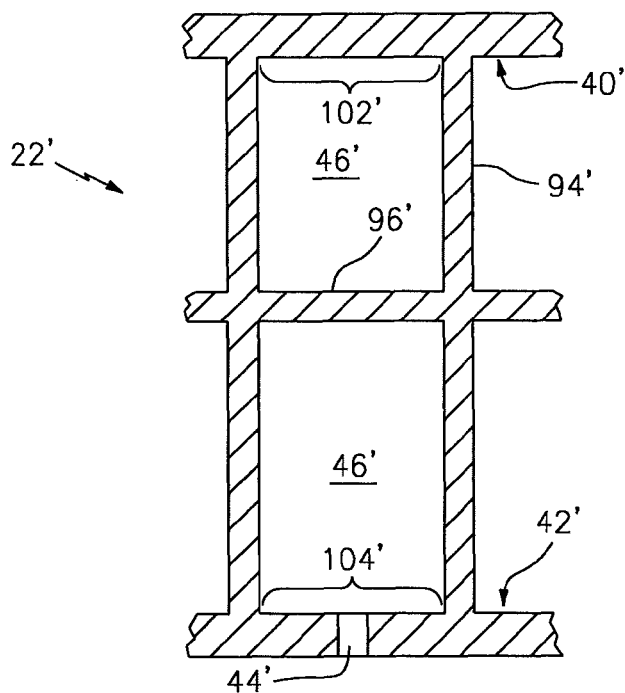
FIG. 6 is a cross section of the acoustic liner taken along line 6-6 of FIG. 5.

Referring to FIGS. 5 and 6, a second, non-limiting, embodiment of the present disclosure is illustrated wherein like elements to the first embodiment have the same identifying numerals except with the addition of a prime symbol. As the second embodiment, an acoustic liner 22' has a matrix of cells 46' each defined longitudinally by walls 94', 96' and an end region 102' carried by a panel 40' and an entry region 104' carried by a face panel 42'. The walls 96' may be generally serpentine in shape, but the adjacent walls 96' may not overlap one-another. That is, the regions 102', 104' may be offset from one-another in the x-coordinate direction but may not be spaced apart from one-another with respect to the same direction.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:

1. An acoustic liner comprising:
    a panel;
    a permeable panel spaced from the panel;
    a plurality of serpentine walls spaced from one-another;
    a plurality of walls spaced from one another;
    wherein each respective one of the plurality of walls span through the plurality of serpentine walls and extends between the panel and the permeable panel;
    wherein each respective one of the plurality of serpentine walls extend between the panel and the permeable panel;
    wherein the panel is non-permeable;
    wherein a cell is defined between first and second adjacent walls of the plurality of walls, between adjacent first and second serpentine walls of the plurality of serpentine walls, and between a first region of the panel and a second region of the permeable panel;
    wherein the second region includes a perforation;
    wherein the cell has a first portion defined in-part by the first region, a second portion defined in-part by the second region, and a constricted portion in fluid communication between the first and second portions and defined in-part between the first and second serpentine walls.

2. The acoustic liner set forth in claim 1, wherein the first and second regions are offset from one-another along the respective panels.

3. The acoustic liner set forth in claim 1, wherein the first and second regions are spaced from one-another along the respective panels.

4. The acoustic liner set forth in claim 1, wherein each one of the plurality of serpentine walls extend laterally from the panel to the permeable panel and includes a lateral cross sectional profile that is serpentine in shape.

5. An acoustic liner comprising:
    a non-permeable panel;
    a permeable panel spaced from the non-permeable panel; and
    a plurality of walls that form a plurality of serpentine cavities, where each of the cavities has a first end that extends towards the non-permeable panel and a second end that extends towards the permeable panel,
    where each of the plurality of serpentine cavities has a first portion having a first cross sectional area, a second portion having a second cross sectional area and a constricted portion in fluid communication with and in between the first and second portions.

* * * * *